United States Patent
Wu

(10) Patent No.: US 10,171,783 B2
(45) Date of Patent: Jan. 1, 2019

(54) RGB SIGNAL TO RGBY SIGNAL IMAGE CONVERTING SYSTEM AND METHOD

(71) Applicant: Shenzhen China Star Optoelectronics Technology Co., Ltd., Shenzhen, Guangdong (CN)

(72) Inventor: Jinjun Wu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 346 days.

(21) Appl. No.: 14/914,021

(22) PCT Filed: Jan. 5, 2016

(86) PCT No.: PCT/CN2016/070146
§ 371 (c)(1),
(2) Date: Feb. 24, 2016

(87) PCT Pub. No.: WO2017/096682
PCT Pub. Date: Jun. 15, 2017

(65) Prior Publication Data
US 2018/0176525 A1    Jun. 21, 2018

(30) Foreign Application Priority Data
Dec. 9, 2015   (CN) .......................... 2015 1 0906266

(51) Int. Cl.
*G09G 5/02* (2006.01)
*H04N 1/60* (2006.01)
*H04N 9/67* (2006.01)
*H04N 9/64* (2006.01)
(Continued)

(52) U.S. Cl.
CPC ............... *H04N 9/646* (2013.01); *G09G 3/20* (2013.01); *H04N 9/67* (2013.01); *H04N 9/68* (2013.01); *G09G 2340/06* (2013.01)

(58) Field of Classification Search
CPC combination set(s) only.
See application file for complete search history.

(56) References Cited

U.S. PATENT DOCUMENTS

| 2010/0013748 A1* | 1/2010 | Cok | H04N 9/67 345/83 |
| 2010/0103200 A1* | 4/2010 | Langendijk | G09G 5/02 345/690 |
| 2012/0133670 A1 | 5/2012 | Kim | |

(Continued)

FOREIGN PATENT DOCUMENTS

| CN | 103428512 A | 12/2013 |
| CN | 104269129 A | 1/2015 |
| CN | 104299598 A | 1/2015 |

*Primary Examiner* — Wesner Sajous
(74) *Attorney, Agent, or Firm* — Andrew C. Cheng

(57) ABSTRACT

An RGB signal to RGBY signal image converting method is disclosed and includes steps of: receiving RGB input signals Ri, Gi, Bi; determining whether a color of the RGB input signals is yellow; and calculating and outputting RGBY output signals Ro, Go, Bo, Yo when the color of the RGB input signals is not yellow, wherein Yo=0, RoGoBo=RiGiBi. An image converting system using the RGB signal to RGBY signal image converting method. The image converting method and system relatively increase a signal fidelity in converting the RGB signal to the RGBY signal.

8 Claims, 3 Drawing Sheets

(51) Int. Cl.
*G09G 3/20* (2006.01)
*H04N 9/68* (2006.01)

(56) References Cited

U.S. PATENT DOCUMENTS

| | | | | |
|---|---|---|---|---|
| 2013/0176498 A1* | 7/2013 | Noutoshi | ................. | H04N 9/68 348/712 |
| 2015/0035852 A1* | 2/2015 | Yang | ........................ | G09G 5/02 345/603 |
| 2015/0146098 A1* | 5/2015 | Kanda | ...................... | G09G 5/02 348/453 |
| 2016/0178892 A1* | 6/2016 | De Greef | ............. | G02B 26/005 345/589 |

* cited by examiner

RGB SIGNAL TO RGBY SIGNAL IMAGE CONVERTING SYSTEM AND METHOD

BACKGROUND OF THE INVENTION

1. Field of the Invention

The present invention relates to a display technology field, and more particular an RGB signal to RGBY signal image converting system and method.

2. Discussion of the Related Art

Currently, in such LCD and OLED image display apparatuses, one pixel unit is composed of a red (R) sub-pixel unit, a green (G) sub-pixel unit and a blue (B) sub-pixel unit. A gray scale value of each sub-pixel unit is controlled to mix to colors to be required for displaying a color image. Since a luminous efficiency of the blue sub-pixel in RGB primary colors is lower, a quality of the display using RGB color model is limited, accordingly. A frequency of yellow color appeared in a video is higher than that of other colors appeared in the same video. Accordingly, another pixel unit composed of a red (R) sub-pixel unit, a green (G) sub-pixel unit, a blue (B) sub-pixel unit and yellow (Y) sub-pixel unit is proposed to improve the luminous efficiency of the RGB display. Also, the yellow color, the gold color or the like, which cannot be actually displayed by the conventional RGB color model, is lively displayed. When the yellow color using as a complementary color of the blue color is enhanced, a display quality of the blue color is increased.

A general signal transmitting connector, such as VGA connecter or DVI connector is used to transmit RGB signals. If the RGB signals are directly used in an RGBY display, a distortion of the image is occurred. Therefore, the RGB signals have to be converted and then inputted to the RGBY display. However, after the RGB signals are converted to the RGBY signals, compared to the original RGB signals, a chroma of the converted RGBY signals is offset to a chroma of the Y sub-pixel. A color shift occurred in a non-yellow area of the image to causes a display distortion of the image.

Therefore, how to convert the RGB signals to the RGBY signals without distortion is a technology problem to be overcome.

SUMMARY OF THE INVENTION

The embodiment of the present invention provides an RGB signal to RGBY signal image converting method and system and to converts the RGB signal to RGBY signal under a non-distortion situation.

The embodiment of the present invention provides the RGB signal to RGBY signal image converting method comprises steps of: receiving RGB input signals Ri, Gi and Bi; determining whether a color of the RGB input signals is yellow; and calculating and outputting RGBY output signals Ro, Go, Bo and Yo when the color of the RGB input signals is not yellow, wherein Y0=0, Ro=Ri, Go=Gi and Bo=Bi.

As a preferred solution, the step of determining whether the color of the RGB input signals is yellow further comprises determining whether the Bi input signal is a minimum of the Ri Gi and Bi input signals; if Bi input signal is the minimum, the color of the RGB input signals is yellow; and if not, the color of the RGB input signals is not yellow.

As a preferred solution, the color of the RGB input signals is yellow, further comprising determining a numerical magnitude relationship between the Ri input signal and Gi input signal; and calculating the RGBY output signals Ro, Go, Bo and Yo according to a determining result.

As a preferred solution, if the Ri input signal is greater than the Gi input signal, the RGBY output signals are calculated to Bo=Bi, Yo=Gi, Go=0 and the Ro output signal is calculated by the Ri input signal and the Yo output signal, according to a theorem of three primary color mixture.

As a preferred solution, the Ro output signal calculated by the Ri input signal and the Yo output signal is further calculated by an equation: $Ro=255*[Ri^\gamma-Yo^\gamma]^{1/\gamma}$, wherein $\gamma$ is a gamma converting factor.

As a preferred solution, if the Ri input signal is not greater than the Gi input signal Gi, the RGBY output signals are calculated to Bo=Bi, Yo=Ri, Ro=0 and the Go output signal is calculated by the Gi input signal and the Yo output signal, according to a theorem of three primary color mixture.

As a preferred solution, the Go output signal calculated by the Gi input signal and the Yo output signal is further calculated by an equation: $Go=255*[Gi^\gamma-Yo^\gamma]^{1/\gamma}$, wherein $\gamma$ is a gamma converting factor.

An RGB signal to RGBY signal image converting system, comprising: a signal receiving unit used to receive RGB input signals Ri, Gi, and Bi; a determining unit used to determine whether a color of the RGB input signals is yellow; a calculating unit used to calculate RGBY output signals Ro, Go, Bo and Yo when the color of the RGB input signals is not yellow, wherein Y0=0, Ro=Ri, Go=Gi and Bo=Bi; and a signal output unit used to output the RGBY output signals Ro, Go, Bo and Yo.

As a preferred solution, to determine whether the color of the RGB input signals is yellow, the determining unit determines whether the Bi input signal is a minimum of the Ri Gi and Bi input signals; if the Bi input signal is the minimum, the color of the RGB input signals is yellow; and if not, the color of the RGB input signals is not yellow.

As a preferred solution, when the determining unit determines that the color of the RGB input signals is yellow, the calculating unit determines a numerical magnitude relationship between the Ri input signal and Gi input signal and calculates the RGBY output signals Ro, Go, Bo and Yo according to a determining result.

As a preferred solution, when the calculating unit determines that the Ri input signal is greater than the Gi input signal, the calculating unit calculates the RGBY output signals to Bo=Bi, Yo=Gi, Go=0 and calculates the Ro output signal by the Ri input signal and the Yo output signal, according to a theorem of three primary color mixture.

As a preferred solution, the calculating unit further calculates the Ro output signal calculated by the Ri input signal and the Yo output signal according to an equation: $Ro=255*[Ri^\gamma-Yo^\gamma]^{1/\gamma}$, wherein $\gamma$ is a gamma converting factor.

As a preferred solution, when the calculating unit determines that the Ri input signal is not greater than the Gi input signal, the calculating unit calculates the RGBY output signals to Bo=Bi, Yo=Ri, Ro=0 and calculates the Go output signal by the Gi input signal and the Yo output signal, according to the theorem of three primary color mixture.

As a preferred solution, the calculating unit further calculates the Go output signal calculated by the Gi input signal and the Yo output signal according to an equation: $Go=255*[Gi^\gamma-Yo^\gamma]^{1/\gamma}$, wherein $\gamma$ is a gamma converting factor.

In the RGB signal to RGBY signal image converting method, when the RGB signals are converted to the RGBY signals, it is first to determine whether the color of the RGB input signals is yellow, and then to calculate the RGBY output signals according to different determining result. Thus, a fidelity is relatively increased. Furthermore, when the color of the RGB input signals is not yellow, the RGBY output signals are Yo=0, RoGoBo=RiGiBi. Accordingly, a color shift is not occurred a non-yellow image of the output signals in an image converting to have a higher fidelity.

DETAILED DESCRIPTION OF THE PREFERRED EMBODIMENTS

The embodiment of the present invention provides an RGB signal to RGBY signal image converting method and system and converts the RGB signals to the RGBY signals under a non-distortion situation.

The RGB signal to RGBY signal image converting method comprises following steps of:
receiving RGB input signals;
determining whether a color of the RGB input signals is yellow or not;
and respectively calculating RGBY output signals and outputting the RGBY output signals, according to a foregoing determining result.

The RGB signal to RGBY signal image converting system comprises:
a signal receiving unit used to receive the RGB input signals;
a determining unit used to determine whether the color of the RGB input signals is yellow;
a calculating unit used to respectively calculate the RGBY output signals according a foregoing determining result; and
a signal outputting unit used to output the RGBY output signals.

According to the drawings, the RGB signal to RGBY signal image converting method and system provided by the embodiments of the present invention are particularly described as follows.

Figure 1:
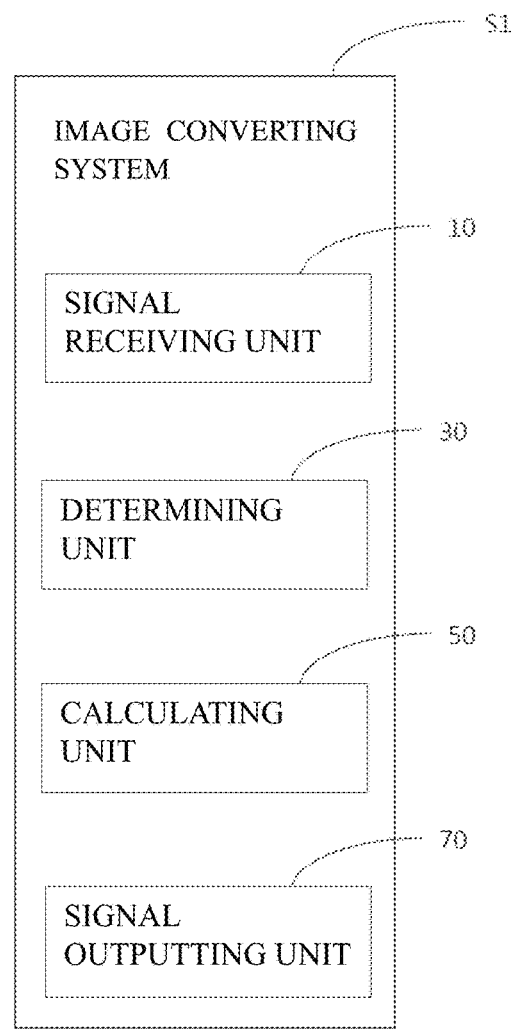
FIG. 1 is a schematic functional block diagram of an RGB signal to RGBY signal image converting system of an embodiment of the present invention.
Figure 2:
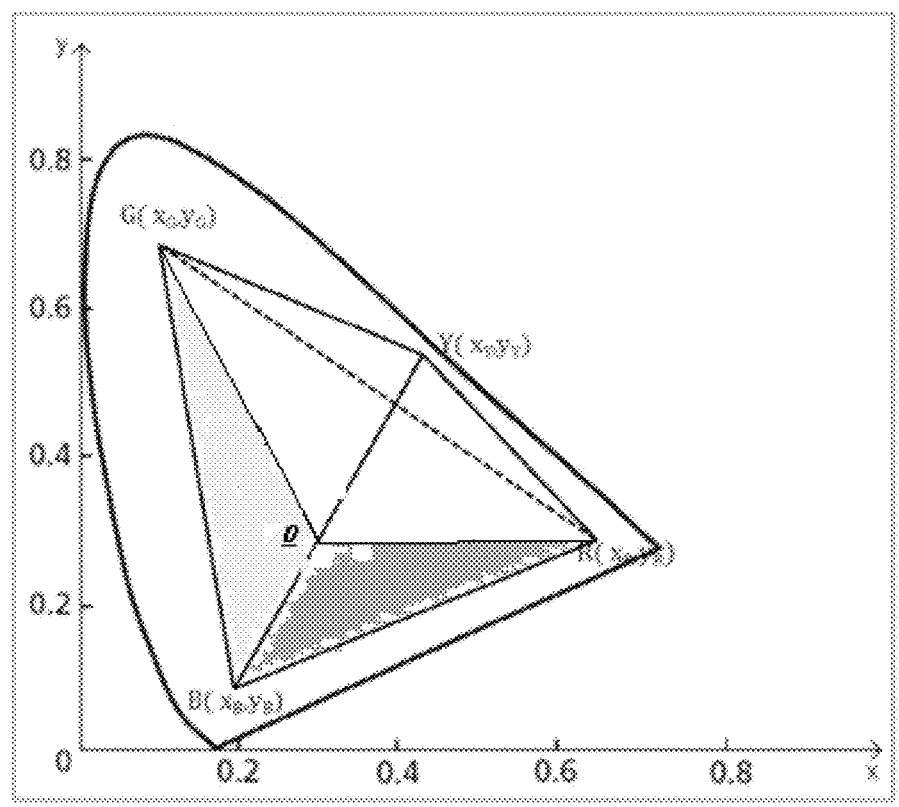
FIG. 2 is a schematic diagram of the RGB signal distributed over a color gamut.

Please refer FIG. 1. FIG. 1 is a functional block diagram of the RGB signal to RGBY signal image converting system. The image converting system S1 can be operated on a hardware or on a combination of a software and a general hardware platform to achieve a goal of converting the RGB input signals to the RGBY signals and outputting the converted RGBY signals.

The image converting system S1 comprises the signal receiving unit 10, the determining unit 30, the calculating unit 50 and the signal outputting unit 70. The signal receiving unit 10 is used to receive the RGB input signal and outputs the RGB input signal to the determining unit 30. The determining unit 30 is used to determine whether the color of the RGB input signals is yellow and to output the determining result to the calculating unit 50. The calculating unit 50 is used to calculate the RGBY output signals according to the determining result of the determining unit 30 and to output the RGBY signals to the signal output unit 70. The signal output unit 70 is used to output the RGBY output signals, wherein each unit of the image converting system S1 is stored in a storage and is programmable module executed by an executer.

Details as follows.

The signal receiving unit 10 is used to receive the RGB input signals. Particularly, the signal receiving unit 10 is used to receive the RGB input signals Ri, Gi, and Bi and outputs the RGB input signals Ri, Gi, and Bi to the determining unit 30, wherein Ri represents a red input signal of the RGB input signals, Gi represents a green input signal of the RGB input signals and Bi represents a blue input signal of the RGB input signals. If each of the red, green and blue input signals is represented by 8 bits, each of the red, green and blue signals has 0 to 255 gray scales (n).

The determining unit 30 is used to determine whether the color of the RGB input signal is yellow or not. Particularly, the determining unit 30 determines whether the blue input signal Bi is a minimum of the red, green and blue input signals Ri, Gi and Bi. If the blue input signal Bi is not the minimum of the red, green and blue input signals Ri, Gi, Bi, it ensures that the color of the RGB input signal is not yellow. If yes, it ensures that the RGB input signal is yellow. The determining unit 30 is also used to output the foregoing determining result to the calculating unit 50.

Figure 3:
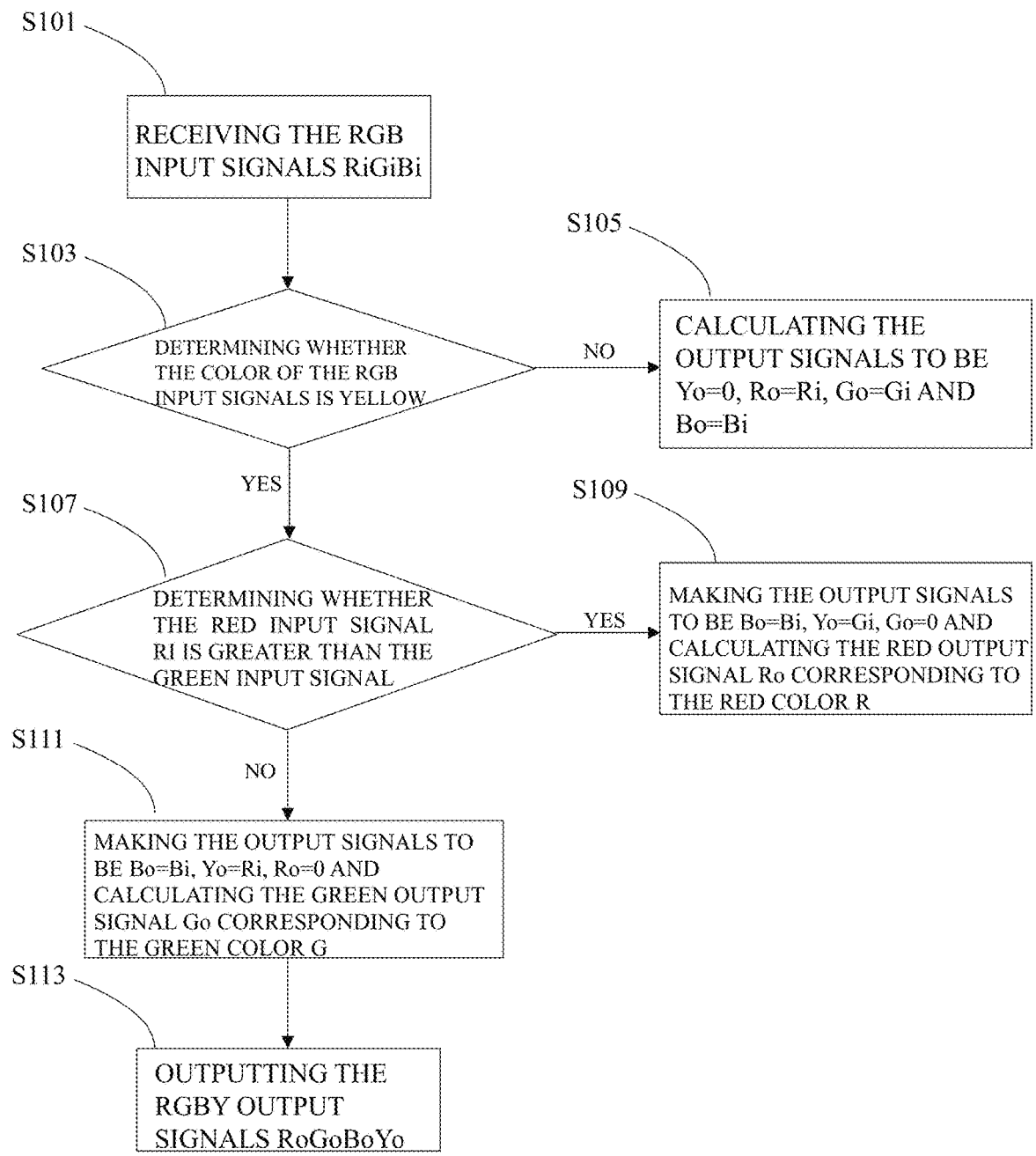
FIG. 3 is a schematic flow chart of an RGB signal to RGBY signal image converting method of an embodiment of the present invention.

Please refer to FIG. 3 at the same time. FIG. 3 shows a distribution of the RGB signals in a color gamut. In the drawing, ROG triangle represents as a yellow color area, BOG triangle represents as a blue area and ROB triangle resets as a red area. Therefore, in RGB signals, when a blue signal B is the minimum of a red, green and blue signal R, G and B, the color of the RGB signals are distributed in the ROG triangle. At the time, a color of the RGB signals is yellow, so the determining unit 30 can determine whether the color of the RGB input signals is yellow according to numerical magnitudes of red, green and blue input signals Ri, Gi and Bi.

The calculating unit 50 is used to respectively calculate the RGBY output signals Ro, Go, Bo and Yo according to the foregoing determining result, wherein Ro represents a red output signal of the RGBY output signals, Go represents a green output signal of the RGBY output signals, Bo represents a blue output signal of the RGB output signals and Yo represents a yellow output signal of the RGBY output signals. Particularly, the calculating unit 50 calculates the RGBY output signals Ro, Go, Bo and Yo for two different conditions, according to the result of determining whether the color of the RGB input signals is yellow. Details as follows.

In the condition one, if the determining unit 30 determines that the color of the RGB input signals is not yellow, the calculating unit 50 calculates the RGBY output signals Ro, Go, Bo and Yo to be Yo=0, Ro=Ri, Go=Gi, Bo=Bi. Thus, the output signals calculated by the calculating unit 50 are equal to the input signals and Yo=0, so the color shift is not occurred in converting the RGB signals and a fidelity is good, when the color of the RGB input signals is not yellow.

In the condition two, if the determining unit 30 determines that the color of the RGB input signals is yellow, the calculating unit 50 determines the red input signal Ri is greater than the green input signal Gi in the red, green and blue input signals Ri, Gi and Bi respectively corresponding to R, G and B colors. The calculating unit 50 respectively calculates the RGBY output signals Ro, Go, Bo and Yo, according to a calculating result. Details as follows.

If the red input signal Ri is greater than the green input signal Gi (when Ri>Gi is real), the calculating unit 50 makes Bo=0, Yo=0, Go=0 and calculates the red output signals Ro by following steps.

According to a theorem of three primary color mixture, a yellow signal Y is formed by mixing a red signal R and a green signal G and Yn=Rn+Gn is obtained by using an idea of the equivalent substitution.

Wherein, a relationship of a brightness and a gray scale is:

$$Ln=L255*(n/255)^{2.2}.$$

The red output signal Ro corresponding to the red color R can be obtained and is $$Ro=255*[Ri^{\gamma}-Yo^{\gamma}]^{1/\gamma},$$

wherein n is a gray scale value, Ln is a brightness value when the gray scale value is n; and γ is a gamma converting factor and is usually set to 2.2.

According to the foregoing calculation, the calculating unit 50 can calculate the RGBY output signals Ro, Go, Bo and Yo.

If the red input signal Ri is not greater than the green input signal Gi (when Ri>Gi is false), the calculating unit 50 makes Bo=Bi, Yo=Ri, Ro=0 and calculates the green output signal Go by following steps.

According to the theorem of three primary color mixture, the yellow signal Y is formed by mixing the red signal R and the green signal G and Yn=Rn+Gn is obtained by using the idea of the equivalent substitution.

Wherein, a relationship of a brightness and a gray scale is:

$$Ln=L255*(n/255)^{2.2}.$$

The green output signal Go corresponding to the green color G can be obtained and is $$Go=255*[Gi^{\gamma}-Yo^{\gamma}]^{1/\gamma},$$

wherein n is a gray scale value, Ln is a brightness value when the gray scale value is n; and γ is a gamma converting factor and is usually set to 2.2.

According to the foregoing calculation, the calculating unit 50 can calculate the RGBY output signals Ro, Go, Bo and Yo.

The calculating unit 50 outputs the RGBY output signals Ro, Go, Bo and Yo to the signal output unit 70.

The signal output unit 70 is used to output the RGBY output signals Ro, Go, Bo and Yo.

When the image converting system S1 provided by the embodiment of the present invention converts the RGB signals to the RGBY signals, Yo=0 in the RGBY output signals if the color of the RGB input signals is not yellow. It can ensure that the color shift is not occurred a non-yellow image of the output signals in converting the RGB signals. If the color of the input signals is yellow, the numerical magnitudes of the red and green input signals Ri, Gi in the RGB input signals are further compared. If Yo is equal to a smaller one of the red and green input signals Ri and Gi, the output signal corresponding to the smaller one of the red and green input signals Ri and Gi is equal to 0. The output signal corresponding to the larger one of the red and green input signals Ri and Gi is calculated according to the theorem of three primary color mixture and the relationship of the brightness and the gray scale. Accordingly, the RGBY output signals Ro, Go, Bo and Yo are obtained. The chroma of the RGBY output signals is not offset to the chroma of the Y sub-pixel when the color of the RGBY output signals is not yellow. The yellow image is brightly colored.

Please refer to FIG. 3 at the same time. FIG. 3 shows a schematic flow chart of the RGB signal to RGBY signal image converting method provided by an embodiment of the present invention. The RGB signal to RGBY signal image converting method is used in the above-mentioned image converting system S1 to convert the RGB signals to the RGBY signals. The image converting system S1 comprises a signal receiving unit 10, a determining unit 30, a calculating unit 50 and a signal output unit 70. The receiving unit 10 is used to receive the RGB input signals and outputs the RGB input signals to the determining unit 30. The determining unit 30 is used to determine whether the color of the RGB input signals is yellow and to output the determining result to the calculating unit 50. The calculating unit 50 is used to calculate the RGBY output signals according to the determining result of the determining unit 30 and to output the RGBY signals to the signal output unit 70. The signal output unit 70 is used to output the RGBY output signals. The image converting method comprises following steps.

Step S101: receiving the RGB input signals Ri, Gi and Bi. Particularly, the signal receiving unit 10 receives the RGB input signals Ri, Gi and Bi.

Step S103: determining whether the color of the RGB input signals is yellow. If not, go to step S105; and if yes, go to step S107. Particularly, the determining unit 30 determines whether the input signal Bi is a minimum of the input signals Ri, Gi, Bi corresponding to R, G and B colors. If the input signal Bi is not the minimum of the input signals Ri, Gi and Bi, the color of the RGB input signals is yellow and go to S107.

Step S105: according to the foregoing determining result, calculating the RGBY output signals Ro, Go, Bo and Yo and go to step S113. Particularly, if the determining unit 30 determines that the color of the input signals is not yellow, the calculating unit 50 calculates the RGBY output signals Ro, Go, Bo and Yo. Details as follows.

The calculating unit 50 makes Yo=0, Ro=Ri, Go=Gi and Bo=Bi. Thus, the calculating unit 50 calculates that the RGBY output signals are equal to the RGB input signals, so the color shift is not occurred in converting the RGB signals and a fidelity is good if the color of the RGB input signals are not yellow. After the calculating unit 50 calculates the RGBY output signals Ro, Go, Bo and Yo, the RGBY output signals are outputted to the signal output unit 70 and go to step S113.

Step S107: continuously determining whether the red input signal Ri is greater than the green input signal Gi of the red, green and blue input signals Ri, Gi, Bi. If yes, go to step S109 and if not, go to step S111. Particularly, if the determining unit 30 determines that the color of the RGB input signals is yellow, the calculating unit continuously determines whether the red input signal Ri is greater than the green input signal Gi of the red, green and blue input signals Ri, Gi and Bi corresponding the R, G and B colors. If yes, go to step S109 and if not, go to step S111.

Step S109: calculating the RGBY output signals Ro, Go, Bo and Yo and go to step S113. Particularly, if the calculating unit 50 determines whether the red input signal Ri is greater than the green input signal Gi (when Ri>Gi is real), the calculating unit 50 continuously calculates the RGBY output signals Ro, Go, Bo and Yo. Details as follows.

The calculating unit 50 makes Bo=0, Yo=0, Go=0 and calculates the red output signals Ro corresponding to the R color by following steps.

According to the theorem of three primary color mixture, the yellow signal Y is formed by mixing the red signal R and the green signal G and Yn=Rn+Gn is obtained by using the idea of the equivalent substitution.

Wherein, a relationship of a brightness and a gray scale is:

$$Ln=L255*(n/255)^{2.2}.$$

The red output signal Ro corresponding to the red color R can be obtained and is $$Ro=255*[Ri^{\gamma}-Yo^{\gamma}]^{1/\gamma},$$

wherein n is gray scale value, Ln is a brightness value when the gray scale value is n; and γ is a gamma converting factor and is usually set to 2.2.

After the calculating unit 50 calculates the RGBY output signals Ro, Go, Bo and Yo, the RGBY output signals are outputted to the signal output unit 70 and go to step S113.

Step S111: calculating the RGBY output signals Ro, Go, Bo and Yo and go to step S113. Particularly, if the calculating unit 50 determines that the red input signal Ri is not greater than the green input signal Gi (when Ri>Gi is false), the calculating unit 50 continuously calculates the RGBY output signals Ro, Go, Bo and Yo. Details as follows.

The calculating unit 50 makes Bo=Bi, Yo=Ri, Ro=0 and calculates the green output signal Go corresponding to green color G by following steps.

According to the theorem of three primary color mixture, yellow signal Y is formed by mixing the red signal R and the green signal G and Yn=Rn+Gn is obtained by using an idea of the equivalent substitution.

Wherein, a relationship of a brightness and a gray scale is:

$$Ln=L255*(n/255)^{\wedge}2.2.$$

The green output signal Go corresponding to the green color G can be obtained and is $$Go=255*[Gi^{\wedge}\gamma-Yo^{\wedge}\gamma]^{\wedge}1/\gamma,$$

wherein n is gray scale value, Ln is the brightness value when the gray scale value is n; and γ is a gamma converting factor and is usually set to 2.2.

After the calculating unit 50 calculates the RGBY output signals Ro, Go, Bo and Yo, the RGBY output signals are outputted to the signal output unit 70 and go to step S113.

Step S113: outputting the RGBY output signals Ro, Go, Bo and Yo. Particularly, the signal output unit 70 outputs the RGBY output signals Ro, Go, Bo and Yo.

When the image converting system S1 provided by the embodiment of the present disclosure converts the RGB signals to the RGBY signals, Yo=0 of the RGBY output signals is made if the color of the RGB input signals is not yellow. It can ensure that the color shift is not occurred a non-yellow image of the output signals in converting the RGB signals. If the color of the input signals is yellow, the numerical magnitudes of the red and green input signals Ri and Gi of the RGB input signals are further compared. If Yo is equal to a smaller one of the red and green input signals Ri and Gi, the output signal corresponding to the smaller one between the red and green input signals Ri and Gi is equal to 0. The output signal corresponding to the larger one of the red and green input signals Ri and Gi is calculated according to the theorem of three primary color mixture and the relationship of the brightness and the gray scale. Accordingly, the RGBY output signals Ro, Go, Bo and Yo are obtained. The chroma of the RGBY output signals is not offset to the chroma of the Y sub-pixel when the color of the RGBY output signals is not yellow. The yellow image is brightly colored.

With the foregoing descriptions of the embodiments, people who skilled in the art can clearly understand that the present invention can be implemented by hardware or a combination of software and general hardware. Accordingly, the technology solution of the embodiment of the present invention can be performed in a form of a software product. The software product can store in a Non-Volatile Memory (may be CD-ROM, USB disk, portable hard disk etc.) and includes multiple instructions to execute the method of each embodiment of the present invention by a computing apparatus.

People who skilled in the art can understand that the attached drawing is a schematic drawing of the preferred embodiment. Blocks or flow chart in the attached drawing is not necessary element of implementing the present invention.

People who skilled in the art can understand that the functional modules/functional units in the system of the embodiment are arranged in the system of the embodiment according to the related descriptions or are changed to arrange in one or more systems, which is different from the system of the original embodiment. The functional modules/functional units in the system of the embodiment may be combined to a single functional module/functional unit and are also further separated to multiple sub-functional modules/sub-functional units.

Apparently, people who skilled in the art can modify or change the present invention and these modifications and changes are still within the scope and spirit of the present invention. If the modifications and changes are belong to the claim scope or the equivalent scope of the claim scope, the present invention has an intention to include these modifications and changes.

What is claimed is:

1. An RGB signal to RGBY signal image converting method for an RGBY image display apparatus having multiple pixel units each of which is consisted of a red sub-pixel unit, a green sub-pixel unit and blue sub-pixel unit, comprises steps of:
   receiving RGB input signals Ri, Gi and Bi from a signal transmitting connector connected to the RGBY image display apparatus;
   determining whether a color of the RGB input signals is yellow and whether the Bi input signal is a minimum of the Ri, Gi and Bi input signals; wherein if the Bi input signal is the minimum, the color of the RGB input signals is yellow; and if not, the color of the RGB input signals is not yellow; and
   calculating and outputting RGBY output signals Ro, Go, Bo and Yo used to control gray scale values of the red, green and blue sub-pixel units for the corresponding pixel unit, when the color of the RGB input signals is not yellow, wherein Y0=0, Ro=Ri, Go=Gi and Bo=Bi.

2. An RGB signal to RGBY signal image converting method for an RGBY image display apparatus having multiple pixel units each of which is consisted of a red sub-pixel unit, a green sub-pixel unit and blue sub-pixel unit, comprises steps of:
   receiving RGB input signals Ri, Gi and Bi from a signal transmitting connector connected to the RGBY image display apparatus;
   determining whether a color of the RGB input signals is yellow, wherein if the color of the RGB input signals is yellow, further comprises determining a numerical magnitude relationship between the Ri input signal and Gi input signal; and calculating the RGBY output signals Ro, Go, Bo and Yo according to a determining result; and
   calculating and outputting RGBY output signals Ro, Go, Bo and Yo used to control gray scale values of the red, green and blue sub-pixel units for the corresponding pixel unit, when the color of the RGB input signals is not yellow, wherein Y0=0, Ro=Ri, Go=Gi and Bo=Bi.

3. The image converting method according to claim 2, wherein if the Ri input signal is greater than the Gi input signal, the RGBY output signals are calculated to Bo=Bi, Yo=Gi, Go=0 and the Ro output signal is calculated by the Ri input signal and the Yo output signal, according to a theorem of three primary color mixture.

4. The image converting method according to claim 3, wherein the Ro output signal calculated by the Ri input signal and the Yo output signal is further calculated by an equation:

$$Ro=255*[Ri\char`^\gamma-Yo\char`^\gamma]\char`^1/\gamma,$$

wherein $\gamma$ is a gamma converting factor.

5. The image converting method according to claim 2, wherein if the Ri input signal is not greater than the Gi input signal Gi, the RGBY output signals are calculated to Bo=Bi, Yo=Ri, Ro=0 and the Go output signal is calculated by the Gi input signal and the Yo output signal, according to a theorem of three primary color mixture.

6. The image converting method according to claim 5, wherein the Go output signal calculated by the Gi input signal and the Yo output signal is further calculated by an equation:

$$Go=255*[Gi\char`^\gamma-Yo\char`^\gamma]\gamma 1/\gamma,$$

wherein $\gamma$ is a gamma converting factor.

7. An RGB signal to RGBY signal image converting system for an RGBY image display apparatus having multiple pixel units each of which is consisted of a red sub-pixel unit, a green sub-pixel unit and blue sub-pixel unit, comprising:
 a signal receiving unit connected to a signal transmitting connector to receive RGB input signals Ri, Gi, and Bi therefrom;
 a determining unit connected to the signal transmitting connector through the signal receiving unit to receive the RGB input signals Ri, Gi, and Bi to determine whether a color of the RGB input signals is yellow, wherein when the determining unit determines that the color of the RGB input signals is yellow, the determining unit determines a numerical magnitude relationship between the Ri input signal and Gi input signal and calculates the RGBY output signals Ro, Go, Bo and Yo according to a determining result;
 a calculator connected to the determining unit to calculate RGBY output signals Ro, Go, Bo and Yo when the color of the RGB input signals is not yellow, wherein Y0=0, Ro=Ri, Go=Gi and Bo=Bi; and
 a signal output unit connected to the calculator to receive the RGBY output signals Ro, Go, Bo and Yo and then output the RGBY output signals Ro, Go, Bo and Yo to the RGBY image display apparatus to control gray scale values of the red, green and blue sub-pixel units for the corresponding pixel unit.

8. The image converting system according to claim 7, wherein when the calculator unit determines that the Ri input signal is greater than the Gi input signal, the calculator unit calculates the RGBY output signals to Bo=Bi, Yo=Gi, Go=0 and calculates the Ro output signal by the Ri input signal and the Yo output signal, according to a theorem of three primary color mixture, wherein:

$$Ro=255*[Ri\char`^\gamma-Yo\char`^\gamma]\char`^1/\gamma,$$

wherein $\gamma$ is a gamma converting factor; and/ or
 when the calculator unit determines that the Ri input signal is not greater than the Gi input signal, the calculator unit calculates the RGBY output signals to Bo=Bi, Yo=Ri, Ro=0 and calculates the Go output signal by the Gi input signal and the Yo output signal, according to the theorem of three primary color mixture, wherein:

$$Go=255*[Gi\char`^\gamma-Yo\char`^\gamma]\char`^1/\gamma,$$

wherein $\gamma$ is a gamma converting factor.

* * * * *